(12) United States Patent
Krause

(10) Patent No.: US 9,469,044 B2
(45) Date of Patent: Oct. 18, 2016

(54) ROUTER ATTACHMENT ASSEMBLY

(71) Applicant: Advanced Architectural Products, LLC, Allegan, MI (US)

(72) Inventor: G. Matt Krause, Allegan, MI (US)

(73) Assignee: Advanced Architectural Products, LLC, Allegan, MI (US)

( * ) Notice: Subject to any disclaimer, the term of this patent is extended or adjusted under 35 U.S.C. 154(b) by 156 days.

(21) Appl. No.: 14/459,300

(22) Filed: Aug. 13, 2014

(65) Prior Publication Data
US 2016/0045993 A1  Feb. 18, 2016

(51) Int. Cl.
| | | |
|---|---|---|
| B27C 5/10 | (2006.01) | |
| B23Q 9/00 | (2006.01) | |
| B23C 1/20 | (2006.01) | |

(52) U.S. Cl.
CPC . *B27C 5/10* (2013.01); *B23C 1/20* (2013.01); *B23Q 9/0014* (2013.01); *Y10T 409/306384* (2015.01); *Y10T 409/306608* (2015.01)

(58) Field of Classification Search
CPC ............ B23C 5/10; B23C 5/04; B23C 5/06; Y10T 409/304088; Y10T 409/306216; Y10T 409/306384; Y10T 409/306552; Y10T 409/306608; Y10T 409/309184; Y10T 409/30924
USPC ......... 144/154.5, 286.1, 285.5, 135.2, 134.1, 144/136.95, 252.1, 253.6, 253.7, 253.2, 144/144.1, 145.1, 145.2; 409/137, 182, 409/175, 181, 178, 228, 229
See application file for complete search history.

(56) References Cited

U.S. PATENT DOCUMENTS

| | | | | |
|---|---|---|---|---|
| 1,022,176 A * | 4/1912 | Boothby | ................... | B27C 5/06 144/243 |
| 2,699,804 A * | 1/1955 | Starnes | .................. | B23Q 3/002 144/242.1 |
| 4,132,256 A * | 1/1979 | Jones | ..................... | B23Q 3/002 144/250.2 |
| 4,197,887 A * | 4/1980 | Groves | ................ | B23Q 35/106 144/136.95 |
| 4,294,297 A * | 10/1981 | Kieffer | ................. | B23Q 35/005 144/154.5 |
| 5,289,861 A * | 3/1994 | Hedrick | ................... | B23Q 9/00 144/134.1 |
| 5,715,880 A * | 2/1998 | Tucker | ................... | B23Q 3/002 144/134.1 |
| 2006/0157155 A1* | 7/2006 | Robinson | .................. | B27C 1/04 144/136.95 |
| 2010/0089496 A1* | 4/2010 | Barnes | ...................... | B27C 5/10 144/48.6 |
| 2011/0192497 A1* | 8/2011 | Clark | ........................ | B27C 5/04 144/371 |
| 2011/0222981 A1* | 9/2011 | Derler | ....................... | B27C 5/02 409/230 |
| 2013/0199671 A1* | 8/2013 | Brodersen | ............... | B27B 25/06 144/253.6 |

* cited by examiner

*Primary Examiner* — Daniel Howell
*Assistant Examiner* — Nicole N Ramos
(74) *Attorney, Agent, or Firm* — The Watson I.P. Group, PLC; Jovan N. Jovanovic; Vladan M. Vasiljevic

(57) ABSTRACT

A router attachment assembly including a base plate, a first side support structure and a second side support structure. The base plate has an upper surface and a lower surface. A plurality of router attachment openings extend through the base plate, which are configured to correspond to openings on a router. Fasteners couple the base plate to the router through the router attachment openings. A central router axle opening allows a router axle to pass therethrough. The first side support structure extends from the base plate and defines a front face. The second side support structure extends from the base plate on an opposing side of the central router opening. The second side support structure includes a biasing member biased toward the first side support structure, to, in turn, urge a material extending through the channel toward and into contact with the first side support structure.

10 Claims, 3 Drawing Sheets

ROUTER ATTACHMENT ASSEMBLY

CROSS-REFERENCE TO RELATED APPLICATION

N/A

BACKGROUND OF THE DISCLOSURE

1. Field of the Disclosure

The invention relates in general to a jig for a router, and more particularly, to a router attachment assembly which positions and directs a material to be cut by the router. Generally, the router comprises a hand held router device.

2. Background Art

The use of foam board insulation is known in the art. It is often the case that such insulation is utilized on the outside of buildings, over the studs and underneath metal cladding in a commercial building configuration. In many applications, the insulation is provided in sheets that are cut to the appropriate dimensions and then coupled to girts that are attached to the building studs or the like.

It is often the case, that trimming, cutting and fitting are done outside at the job site. Problematically, some of the trimming, cutting and fitting is difficult to accomplish at the job site, and, more particularly, difficult to properly execute. At the jobsite, it is difficult to accurately measure and cut the insulation to desired specifications. Additionally, the insulation is often not uniform (as it may vary in thickness within a single sheet, and over a set of sheets). As a result, it is even more difficult to properly make successive operations and have the different sheets accurately assemble on the girts that are on the studs.

SUMMARY OF THE DISCLOSURE

The disclosure is directed to a router attachment assembly comprising a base plate, a first side support structure and a second side support structure. The base plate has an upper surface and a lower surface opposite the upper surface. A plurality of spaced apart router attachment openings extend through the base plate. The openings are configured to correspond to openings on a router. Fasteners are configured to couple the base plate to the router through the spaced apart router attachment openings. A central router axle opening is configured to allow a router axle to pass therethrough upon coupling of the base plate to the router. The first side support structure extends from the base plate and defines a front face. The second side support structure extends from the base plate on an opposing side of the central router opening from the first side support structure. The first side and the second side supports and the base plate defining a channel for material to extend through. The second side support structure includes a biasing member biased toward the first side support structure, to, in turn, urge a material extending through the channel toward and into contact with the first side support structure.

In some configurations, the upper surface of the base plate is substantially planar within the channel, and the first side support structure is substantially perpendicular to the upper surface of the base plate.

In some configurations, the biasing member includes a contact face. The contact face is substantially perpendicular to the upper surface of the base plate.

In some configurations, the second side support structure includes a body structure fixed to the base plate. The biasing member comprises a leaf spring that has a first end coupled to the body structure of the second side support structure and a second end extending therefrom. The leaf spring is pivotable about the first end so that the position of the second end can be varied relative to the first side support structure.

In some configurations, the leaf spring includes a contact face that is configured to interface with the material positioned within the channel.

In some configurations, the leaf spring is substantially convex in the direction of the first side support structure.

In some configurations, the contact face is substantially perpendicular to the base plate.

In some configurations, the biasing member is integrally molded with the second side support structure which is integrally molded with the base plate.

In some configurations, the router attachment openings comprise a plurality of sets of router attachment openings. Each set of router attachment openings is spaced apart from the other of the plurality of sets of router attachment openings. Upon selection of alternate sets of router attachment openings, the position of a router axle relative to the first side support structure is altered.

In some configurations, each of the sets of router attachment openings adjusts the position of the router axle relative to the first side support structure a predetermined distance, incrementally.

In some configurations, the first side support structure includes a body structure extending from the front face in a direction away from the second side support structure.

BRIEF DESCRIPTION OF THE DRAWINGS

The disclosure will now be described with reference to the drawings wherein.

DETAILED DESCRIPTION OF THE DISCLOSURE

Figure 1:
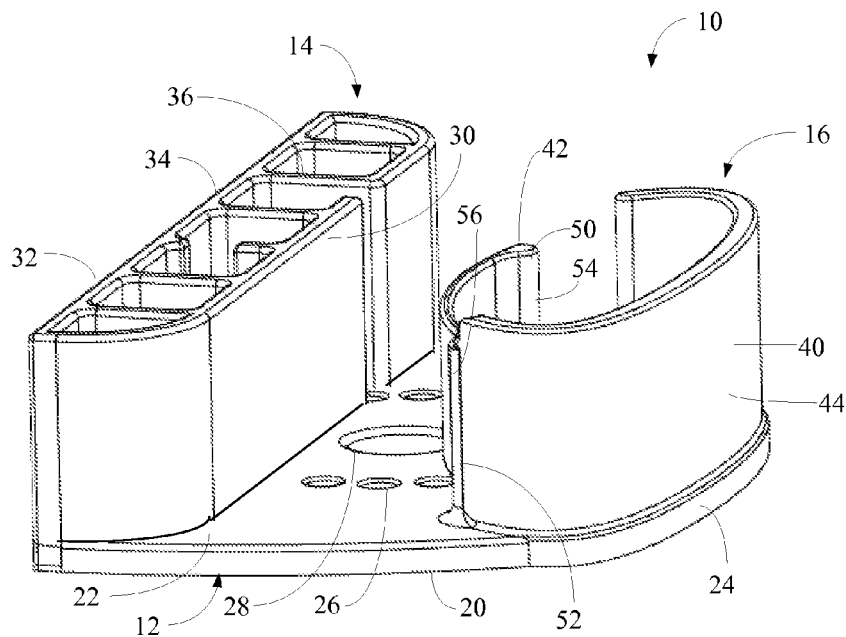
FIG. 1 of the drawings is a perspective view of the router attachment assembly of the present disclosure.
Figure 2:
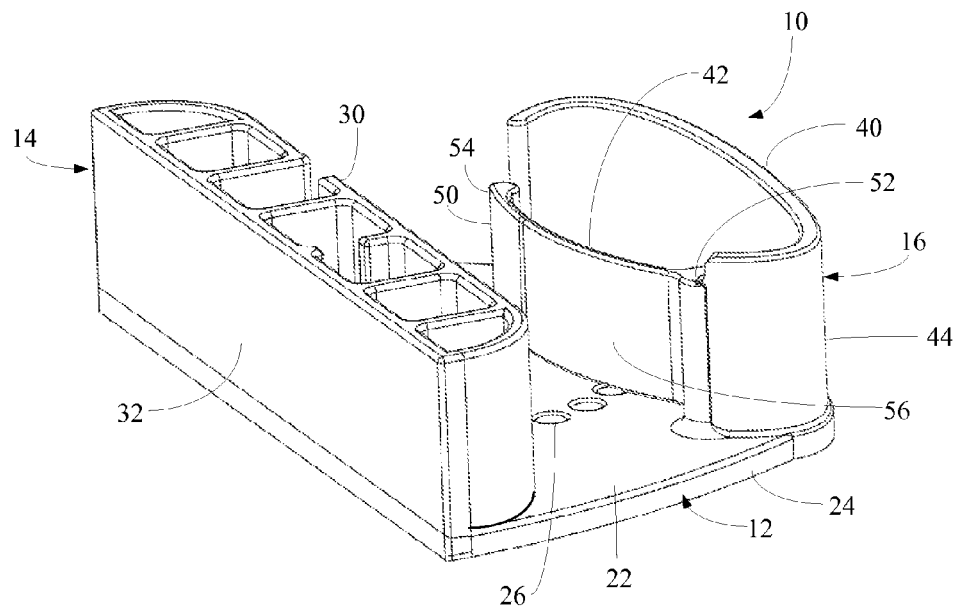
FIG. 2 of the drawings is a perspective view of the router attachment assembly of the present disclosure.
Figure 3:
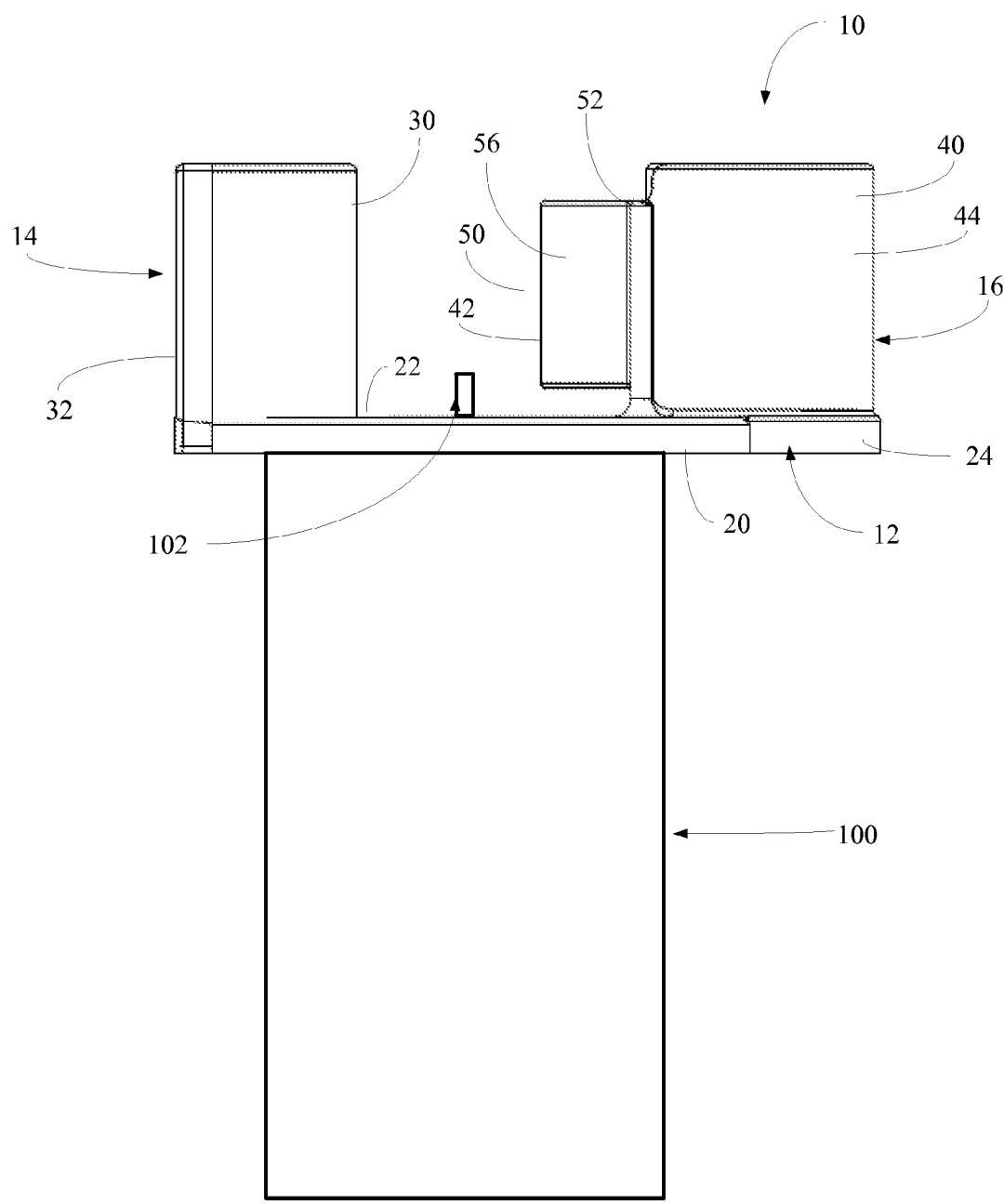
FIG. 3 of the drawings is a side elevational view of the router attachment assembly of the present disclosure, showing, in particular the attachment thereof to a router 100 having router bit 102.
Figure 4:
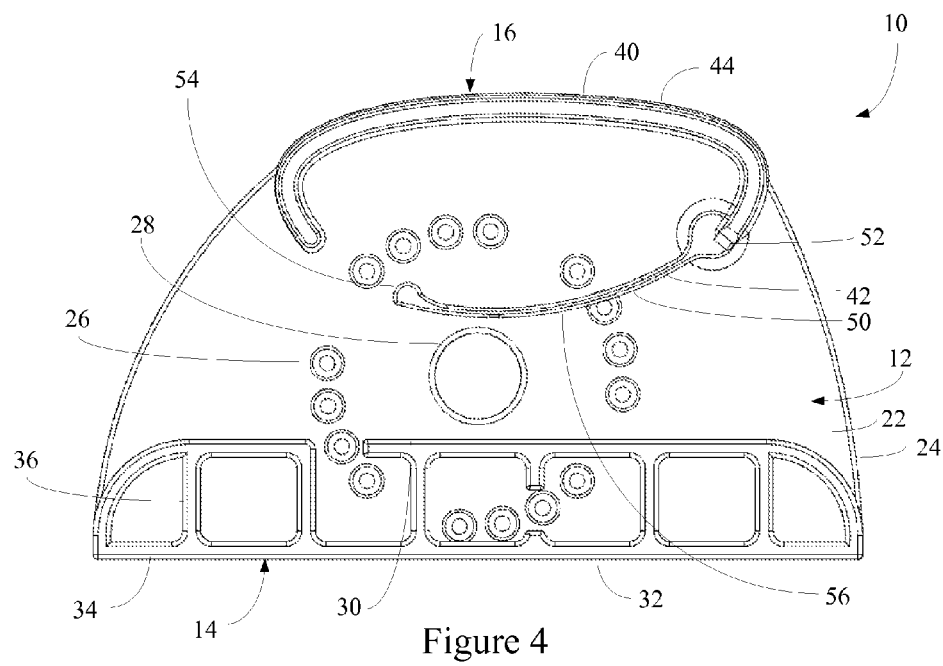
FIG. 4 of the drawings is a top plan view of the router attachment assembly of the present disclosure.
Figure 5:
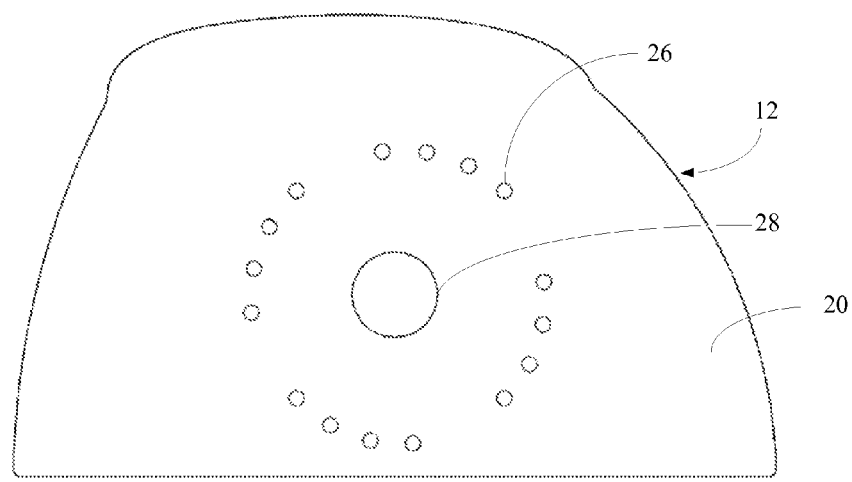
FIG. 5 of the drawings is a bottom plan view of the router attachment assembly of the present disclosure.

While this invention is susceptible of embodiment in many different forms, there is shown in the drawings and described herein in detail a specific embodiment with the understanding that the present disclosure is to be considered as an exemplification and is not intended to be limited to the embodiment illustrated It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Referring now to the drawings and in particular to FIG. 1, the router attachment assembly is shown generally at 10. The router attachment assembly is configured for attachment to a hand-held router so as to make a channel in a piece of stock material. In one use, the router attachment assembly is configured for the making of a channel along an edge of a foam insulation board. Of course, the use of the router attachment assembly is not limited to such a use, and, it will be understood that other uses are likewise contemplated. Among other solutions, the router attachment assembly is shown in a configuration that can be coupled to a RIGID™ brand router, model number R2401, available from THE HOME DEPOT™ of Atlanta, Georgia. It will be understood that the router attachment assembly may be coupled to any number of different routers, and that the base plate 12 may be adapted (i.e., the attachment openings and axle opening may be moved and adjusted in relative position) so as to be attached to other routers, zip saws, or other rotating bit driven tools.

The router attachment assembly 10 is shown as comprising base plate 12, first side support structure 14 and second side support structure 16. It is contemplated that the router attachment assembly 10 comprise a single integrally formed member that can be from a polymer based material, or a composite material. Of course, other materials, such as wood or metal castings or machinings are contemplated. Additionally, it is contemplated that instead of a single integrally formed member, the router attachment assembly may be assembled from a plurality of separate components. In one configuration, the router attachment assembly comprises a three dimensional printed part that is formed in a three dimensional printer.

The base plate 12 includes lower surface 20 and upper surface 22 which define outer perimeter 24. The base plate is substantially planar and provides a base surface upon which to guide the material to be cut as well as a base surface to which the router may be coupled. It will be understood that the material is slid along the upper surface 22 whereas the router is attached to the lower surface 20. In the embodiment shown, the base plate is approximately a quarter of an inch thick, with the upper and lower surfaces being substantially identical (that is, the outer perimeter is substantially uniformly perpendicular to the upper and lower surfaces). The thickness of the base plate and the shape of the base plate can be varied depending on the material to be cut and the material from which the base plate is made. The configuration of the base plate and the size of the base plate for the particular configuration shown was for purposes of ease of holding by the hand of a user. Further structures which allow for improved hand manipulation are likewise contemplated.

The base plate 12 includes a plurality of router attachment openings 26 which are configured to match with, or correspond to, threaded fasteners or openings on the router. For example, with the router identified above, the positioning of the router attachment openings corresponds to threaded openings on the housing base of the router (i.e., for accepting a base plate or a guide or the like). In the configuration shown, a total of four substantially evenly spaced openings extend through the base plate and correspond to four openings.

The central router axle opening 28 is shown as being generally centrally located on the base plate. The central router axle opening 28 is configured to allow the extension of the router therethrough. Due to tolerance variations and the like, the central router axle opening 28 is oversized for receipt of the router axle.

In the embodiment shown, the router attachment openings 26 may comprise a plurality of sets of router attachment openings, each set of which is rotationally offset from the last or previous set. Depending on the one of sets of router attachment openings to which the user couples the router, the relative position of the router vis-à-vis the base plate can be varied slightly (i.e., each set moves the router bit toward or away from the first side support structure a predetermined distance). As such, the set of router attachment openings to which the router is attached determines the spacing of the router axle (and in turn, the slot that is cut in the material) relative to the first side support structure (or to both the first side support structure and the second side support structure). In the embodiment shown, the holes are rotated 12 degrees from each other so as to miss the previous hole, then located 0.01" up from the previous set. In this manner, multiple sets can be formed that do not interfere with each other. By making the central router axle opening 28 larger than the router axle, regardless of which set of openings are utilized, the router axle remains within the footprint of the central router axle opening.

The first side support structure 14 is shown in FIG. 1 as comprising front face 30 and body structure 32. The front face 30 includes a portion that is configured to receive and for a guide for the material. That is, the front face 30 is dimensionally configured with the router attachment openings, so that the axle is in a correct position relative to the front face 30. In the configuration shown, the front face includes a substantially planar portion that is perpendicular to the upper surface of the base plate. This generally allows for the squaring up of the material that is to be cut. In other embodiments, additional features such as grooves, guides or the like may be employed to position the material in the position desired.

The body structure 32 provides rigidity to the front face, and provides a portion that can be grasped by the hand of a user. The body structure, more particularly, includes outer panel 34 and support webbing 36. The outer panel 34 extends generally around the front face from one side to the other side. The support webbing provides rigidity by tying the body structure to the front face. In the embodiment shown, due to the position of the router attachment openings, portions of the front face were removed to provide access thereto. In other embodiments, the front face may comprise a continuous member.

The second side support structure 16 is shown in FIG. 1 as comprising body structure 40 and biasing member 42. The body structure 40 includes outer panel 44 having a first end and second end. In the embodiment shown, the outer panel follows the perimeter and then arcs inwardly at both the first end and the second end. The outer panel provides for stability and security of the biasing member, as well as being configured for grasping by a user.

The biasing member 42 is shown as comprising a leaf spring 50 having a first end 52, a second end 54 and a contact face 56. The leaf spring is coupled at a first end 52 to the first end of the outer panel 44 and the second end 54 extends toward the second end of the outer panel 44. The leaf spring 50 arcuate and inwardly convex toward the first side support structure. The inner surface facing the first side support structure includes a contact face 56 which is configured to engage material to be cut that is positioned in the channel defined by the front face 30, the base plate 12 and the contact face 56 toward the front face of the first side support structure. In other embodiments, the leaf spring may be coupled to another portion of the body structure.

In still other embodiments and configurations, the biasing member may comprise a compression spring, a coil spring, or an pneumatic member which imparts a force on the material to be cut to urge the material toward and into contact with the front face of the first side support structure.

For example, a member forming the contact face can be coupled to one end of such a biasing member, and the biasing member may be coupled to the body structure of the second side support structure, with the biasing member directing the contact face toward the first side support structure. In yet another embodiment, the biasing member may comprise a foam member that can be elastically deformed, whereupon a biasing force can be exerted by the foam member returning to its original configuration.

In operation, the user first is provided with the router attachment assembly and a router of a type which is configured to matingly engage with the router attachment assembly. The user positions the base plate 12 in a position that the router attachment openings correspond with the threaded openings found on the router. Once the openings have been lined up, fasteners can be extended through the router attachment openings and fastened to the router. The openings may include an annular recess to allow for the countersinking of the fasteners at or below the upper surface of the base plate.

Once fastened, the system is ready for use. In particular, the router is activated and a piece of material is inserted into the channel formed by the side support structures and the base plate. When inserted, the biasing member 42 urges and directs the material toward and into contact with the front face of the first side support structure. The biasing member 42 continues to push against the material to insure that the material remains firmly against the first side support structure. Next, the material is directed longitudinally through the channel, and the spinning router bit forms a slot in the material, at the precise point desired relative to the outer surface which is abutting the front face. Once completed, the base plate can be removed from the router as desired.

In the embodiment having a plurality of router attachment openings, the user can measure the exact desired position of the slot in the material. The user can then select the set of router attachment openings that when utilized to couple the router, position the axle of the router in a position within the central router axle opening that is the correct distance from the front face 30.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. A router attachment assembly comprising:
   a base plate having an upper surface and a lower surface opposite the upper surface, a plurality of spaced apart router attachment openings extending through the base plate, configured to correspond to openings on a router, whereupon fasteners are configured to couple the base plate to the router through such spaced apart router attachment openings, and a central router axle opening configured to allow a router axle to pass therethrough upon coupling the base plate to the router;
   a first side support structure extending from the base plate and defining a front face;
   a second side support structure extending from the base plate on an opposing side of the central router axle opening from the first side support structure, wherein the first side and the second side supports and the base plate defining a channel for material to extend through;
   wherein the second side support structure includes a biasing member biased toward the first side support structure, to, in turn, urge a material extending through the channel toward and into contact with the first side support structure; and
   wherein the biasing member is integrally molded with the second side support structure which is integrally molded with the base plate.

2. The router attachment assembly of claim 1 wherein the upper surface of the base plate is substantially planar within the channel, and the first side support structure is substantially perpendicular to the upper surface of the base plate.

3. The router attachment assembly of claim 2 wherein the biasing member includes a contact face, the contact face being substantially perpendicular to the upper surface of the base plate.

4. The router attachment assembly of claim 1 wherein the second side support structure includes a body structure fixed to the base plate, the biasing member comprising a leaf spring that has a first end coupled to a body structure of the second side support structure and a second end extending therefrom, wherein the leaf spring is pivotable about the first end so that the position of the second end can be varied relative to the first side support structure.

5. The router attachment assembly of claim 4 wherein the leaf spring includes a contact face that is configured to interface with the material positioned within the channel.

6. The router attachment assembly of claim 5 wherein the leaf spring is substantially convex in the direction of the first side support structure.

7. The router attachment assembly of claim 6 wherein the contact face is substantially perpendicular to the base plate.

8. The router attachment assembly of claim 1 wherein the router attachment openings comprise a plurality of sets of router attachment openings, wherein each set of router attachment openings is spaced apart from the other of the plurality of sets of router attachment openings, whereupon selection of alternate sets of router attachment openings, alters the position of a router axle relative to the first side support structure.

9. The router attachment assembly of claim 8 wherein each of the sets of router attachment openings adjusts the position of the router axle relative to the first side support structure a predetermined distance, incrementally.

10. The router attachment assembly of claim 1 wherein the first side support structure includes a body structure extending from the front face in a direction away from the second side support structure.

* * * * *